United States Patent
Choi

Patent Number: 5,771,126
Date of Patent: Jun. 23, 1998

[54] HARD DISK DRIVE WITH REDUCED SIZED SERVO SECTORS AND DRIVING METHOD THEREFOR

[75] Inventor: Soo-il Choi, Suwon, Rep. of Korea

[73] Assignee: SamSung Electronics Co., Ltd., Suwon, Rep. of Korea

[21] Appl. No.: 744,873

[22] Filed: Nov. 8, 1996

[30] Foreign Application Priority Data

Nov. 8, 1995 [KR] Rep. of Korea ............... 1995/40269

[51] Int. Cl.$^6$ ................................................. G11B 5/596
[52] U.S. Cl. ..................... 360/49; 360/77.8; 360/78.14
[58] Field of Search ..................... 360/49, 77.8, 78.14, 360/77.05, 48, 78.04

[56] References Cited

U.S. PATENT DOCUMENTS

| | | | |
|---|---|---|---|
| 2,485,322 | 1/1949 | Chainer et al. | 360/77.5 |
| 4,984,100 | 1/1991 | Takayama et al. | 360/49 |
| 5,268,800 | 12/1993 | Nielsen | 360/77.5 |
| 5,305,302 | 4/1994 | Hardwick | 360/77.08 |
| 5,307,218 | 4/1994 | Kitamura et al. | 360/77.08 |
| 5,339,207 | 8/1994 | Moon et al. | 360/77.8 |
| 5,384,671 | 1/1995 | Fisher | 360/49 |
| 5,420,730 | 5/1995 | Moon et al. | 360/77.8 |
| 5,459,623 | 10/1995 | Blagaila et al. | 360/77.08 |
| 5,465,182 | 11/1995 | Ishikawa | 360/77.5 |
| 5,499,232 | 3/1996 | Hardwick | 360/77.5 |
| 5,576,909 | 11/1996 | Dierkes et al. | 360/78.09 |

FOREIGN PATENT DOCUMENTS 0 560 282 A2  9/1993  European Pat. Off. .

*Primary Examiner*—Thang V. Tran
*Attorney, Agent, or Firm*—Robert E. Bushnell, Esq.

[57] ABSTRACT

The present invention provides a hard disk drive that employs a plurality of data recording disks. According to a first embodiment, one of the data recording disks provides first and second recording surfaces that each exhibit specific servo patterns. The first recording surface includes first servo sectors with first burst regions positioned within each one of the first servo sectors. Each one of the first servo sectors has a first full gray code recorded outside the corresponding first burst regions. The second recording surface includes second servo sectors with second burst regions positioned within each one of the second servo sectors. Each one of the second servo sectors has a second full gray code recorded within the corresponding second burst regions and no gray code recorded outside the corresponding second burst regions. The remaining data recording disks each have recording surfaces with the same servo pattern as the second recording surface.

34 Claims, 8 Drawing Sheets

GRAY CODE INCLUDED

GRAY CODE INCLUDED

FIG. 1A
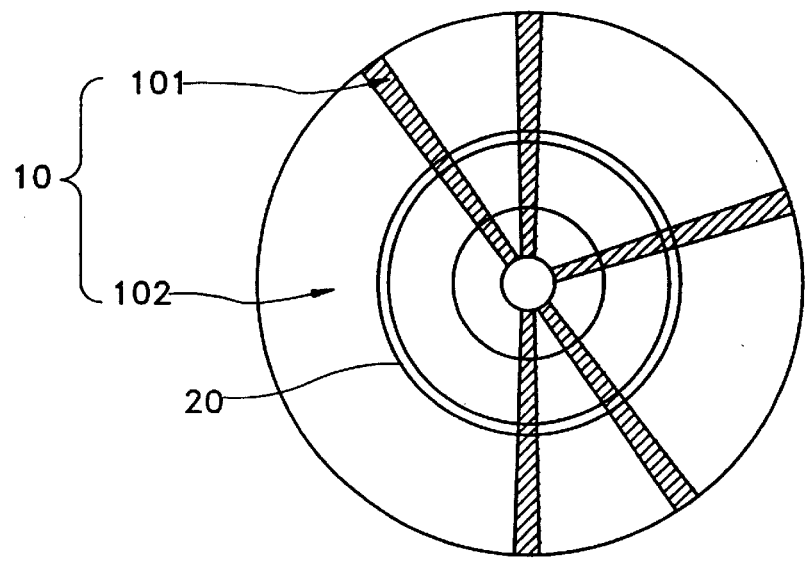
FIG. 1B
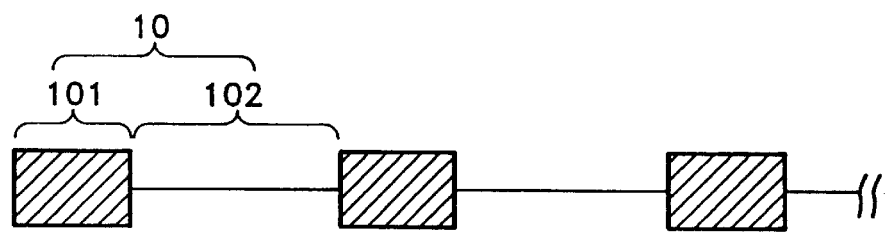
FIG. 2
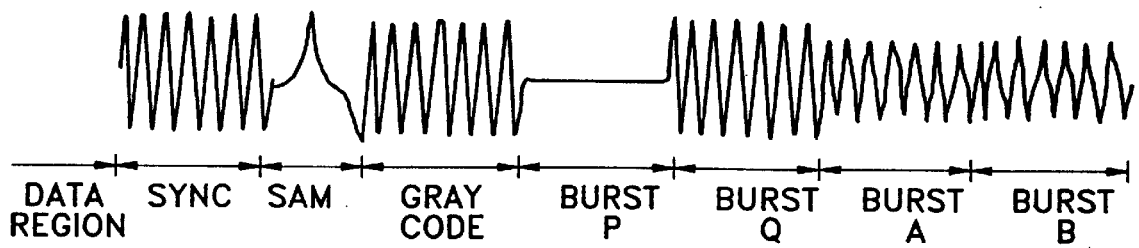
FIG. 3

FIG. 5
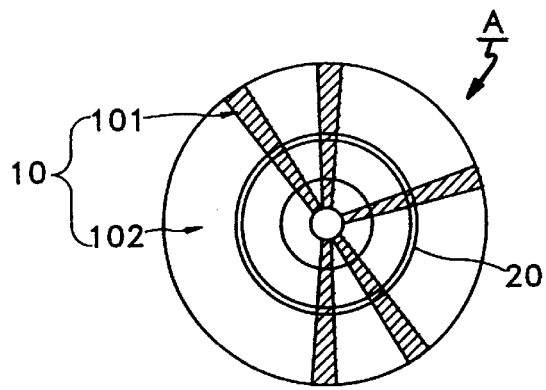
FIG. 6
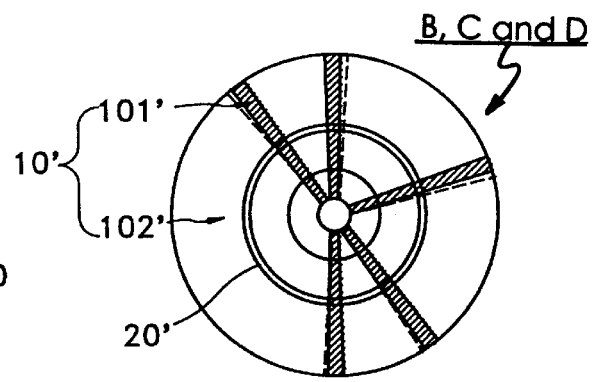
FIG. 7
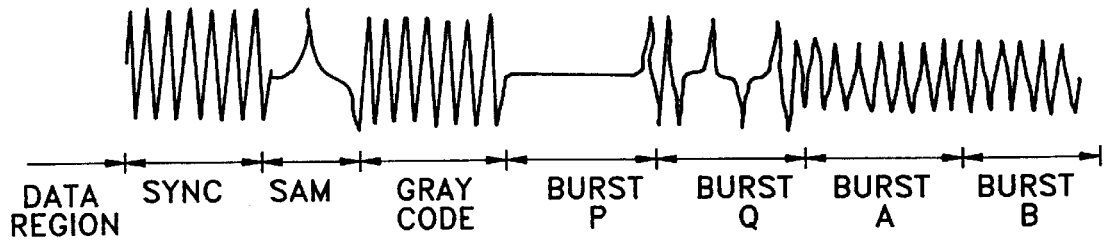
FIG. 8
FIG. 9

FIG. 16

| SERVO SECTOR m | | | | | | | DATA SECTOR | |
|---|---|---|---|---|---|---|---|---|
| SERVO FIELD m | | | | | | | ID FIELD | DATA FIELD |
| SYNC | SAM | IDX | GRAY-CODE | PAD | BURST | PAD | ID FIELD | DATA FIELD |
| 4.8 μs | 0.8 μs | 0.8 μs | 5.2 μs | 0.4 μs | 4.8 μs | 0.4 μs | 28 Bytes | 542 Bytes |

FIG. 17

| SERVO SECTOR m | | | | | | | DATA SECTOR | |
|---|---|---|---|---|---|---|---|---|
| SERVO FIELD m | | | | | | | ID FIELD | DATA FIELD |
| SYNC | SAM | IDX | GRAY | PAD | BURST | PAD | ID FIELD | DATA FIELD |
| 4.8 μs | 0.8 μs | 0.8 μs | 5.2 μs | 0.4 μs | 4.8 μs | 0.4 μs | 28 Bytes | 542 Bytes |

FIG. 18

| SERVO SECTOR m | | | | | DATA SECTOR | | SAVED AREA/TIME |
|---|---|---|---|---|---|---|---|
| SERVO FIELD m | | | | | ID FIELD | DATA FIELD | |
| SYNC | SAM | PAD | BURST | PAD | ID FIELD | DATA FIELD | |
| 4.8 μs | 0.8 μs | 0.4 μs | 4.8 μs | 0.4 μs | 28 Bytes | 542 Bytes | |

HARD DISK DRIVE WITH REDUCED SIZED SERVO SECTORS AND DRIVING METHOD THEREFOR

CROSS REFERENCE TO RELATED APPLICATIONS

This application makes reference to, incorporates the same herein, and claims all benefits accruing under 35 U.S.C. §119 from an application for Hard Disk Drive With Reduced Sized Servo Sectors And Driving Method Therefor earlier filed in the Korean Industrial Property Office on 8 Nov. 1995 and there duly assigned Ser. No. 40269/1995.

BACKGROUND OF THE INVENTION

The present invention relates to a hard disk drive with reduced sized servo sectors, and more particularly, to a hard disk drive with reduced sized servo sectors obtained by including gray code within burst regions during the recording of the servo sectors, thereby allowing more space for data sectors.

In the field of magnetic recording in disk drives where a plurality of tracks are recorded on a rigid magnetic disk, embedded servo information is often utilized to identify the address of the tracks and the sectors within the tracks, and is also utilized for head positioning through feedback control systems. In addition to the servo information, magnetic disks contain data sectors where a user's data is actually stored. The size of these data sectors, however, is limited based on the amount of recording space occupied by the servo information. Therefore, in order to increase the size of the data sectors, it is necessary to reduce the size of the sectors containing the servo information.

The concept of increasing data storage space on a magnetic recording media is not altogether new. For example, U.S. Pat. No. 5,339,207 entitled Servo System For Providing Increased Recording Density And Improved Operation Of The AGC Circuitry issued to Moon et al. discloses a servo system for use in a magnetic recording media in which the system utilizes short and long address tracks in a predetermined pattern to increase the usable data storage space on the recording media. In particular, a special pattern is provided preceding the track address portion of the sectors to identify the associated track address as being a long address, a short address or as an origin sector. While conventional art, such as Moon et al. '207, provides certain advantages, I believe that an improved technique for increasing the usable data storage space on a recording disk exists.

SUMMARY OF THE INVENTION

Therefore, it is an object of the present invention to provide a hard disk drive employing data recording disks having reduced sized servo sectors.

It is another object to provide a hard disk drive employing data recording disks with designated servo patterns that enable stable servo control.

It is still another object to provide a hard disk drive employing data recording disks having enlarged data sectors.

To achieve these and other objects, the present invention provides a hard disk drive that employs a plurality of data recording disks. According to a first embodiment, one of the data recording disks provides first and second recording surfaces that each exhibit specific servo patterns. The first recording surface includes first servo sectors with first burst regions positioned within each one of the first servo sectors. Each one of the first servo sectors has a first full gray code recorded outside the corresponding first burst regions. The second recording surface includes second servo sectors with second burst regions positioned within each one of the second servo sectors. Each one of the second servo sectors has a second full gray code recorded within the corresponding second burst regions and no gray code recorded outside the corresponding second burst regions. The remaining data recording disks each have recording surfaces with the same servo pattern as the second recording surface of the first embodiment.

According to a second embodiment, one of the data recording disks provides first and second recording surfaces that each exhibit specific servo patterns. The first recording surface includes first servo sectors with first burst regions positioned within each one of the first servo sectors. Each one of the first servo sectors has a first full gray code recorded outside the corresponding first burst regions. The second recording surface includes second servo sectors with second burst regions positioned within each one of the second servo sectors. Each one of the second servo sectors has a second full gray code recorded within the corresponding second burst regions and a partial gray code recorded outside the corresponding second burst regions. The remaining data recording disks each have recording surfaces with the same servo pattern as the second recording surface of the second embodiment.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein:

FIG. 1A is a diagram showing the servo sectors of a hard disk on which a servo pattern is recorded according to an embedded servo method;

FIG. 1B is a flat diagram of a track on the hard disk of FIG. 1A;

FIG. 2 is a diagram showing the servo pattern of the hard disk of FIG. 1A;

FIG. 3 is a diagram showing a read back waveform from the hard disk of FIG. 1A;

FIG. 5 is a diagram showing a recording surface on which a servo pattern is recorded using a full gray code outside the burst regions according to the principles of the present invention;

FIG. 6 is a diagram showing recording surfaces on which a servo pattern is recorded by completely or partially omitting the recording of gray code from outside the burst regions according to the principles of the present invention;

FIG. 7 shows the structure of a servo pattern on a specific recording surface with a full gray code recorded outside the burst regions, as shown in FIG. 5;

FIG. 8 shows a read back waveform of a servo pattern recorded on the specific recording surface using a full gray code outside the burst regions, as shown in FIG. 5.

FIG. 9 shows the structure of a servo pattern on the remaining recording surfaces having a reduced servo field with no gray code recorded outside the burst regions, as shown in FIG. 6;

FIG. 16 shows a servo pattern recorded on a recording surface, as shown in FIG. 2;

FIG. 17 shows an embodiment of the present invention in which the servo pattern on a specific recording surface is provided with a full gray code outside the burst regions, as shown in FIG. 5;

FIG. 18 shows an embodiment of the present invention in which the servo pattern on the remaining recording surfaces (except for the specific recording surface shown in FIG. 5) is provided with no gray code recorded outside the burst regions, as shown in FIG. 6.

DETAILED DESCRIPTION OF THE INVENTION

Turning now to the drawings and referring to FIG. 1A, a diagram showing the servo sectors of a hard disk on which a servo pattern is recorded according to an embedded servo method is to illustrated. FIG. 1B is a flat diagram of a track on the hard disk of FIG. 1A.

The hard disk of FIG. 1A includes tracks and sectors upon which data is read from or written to. Each track 20 and sector 10 has its own number, such as gray code or servo sector number (SSN). Sector 10 includes a servo sector 101 for disk servo driving, and a data sector 102 having a data field and an identification (ID) field where a user records information.

A servo pattern, which includes servo information such as the track number or the sector number, is recorded on servo sector 101 and includes a SYNC portion, a servo address mark (SAM), gray code, and bursts, as shown in FIG. 3. The SYNC portion is recorded to enable more stable detection of the servo pattern when a head is moved from the data sector to the servo sector. The servo address mark (SAM) is a signal used for system synchronization; that is, even if the timing of the servo pattern read by the head is shifted by vibrations of a spindle motor which rotates the disk, the servo signal synchronized with the shifted servo pattern can be read. The gray code is a header (ID) for identifying a track. The bursts are signals used for determining how far the head is from a target track to be read from or written to.

Servo control of the hard disk drive is performed by track seeking which positions the read/write head on a target track using the gray code of the servo pattern to identify the track, and track following which keeps the read/write head on the target track by reading the bursts of the target track, thus performing the read/write operation according to a user's intent. Maintaining the read/write head on the target track is referred to as track following.

From the above description it should be clear that the servo pattern is indispensable for controlling the read/write head. The servo pattern, as shown by the read-back waveform diagram of FIG. 3, is recorded in a digital format. As shown by the read-back waveform of FIG. 3 (which is a signal waveform detected from the servo pattern), one of the bursts P and Q has full amplitude and the other has a zero amplitude, according to an odd or even track number.

As shown in FIG. 2, the servo pattern permits the gray code to occupy a large area so that the area of the data sector reserved for user information is reduced. Accordingly, a reduction in the size of the servo sector is required to increase the size of the data sector.

Figure 4:
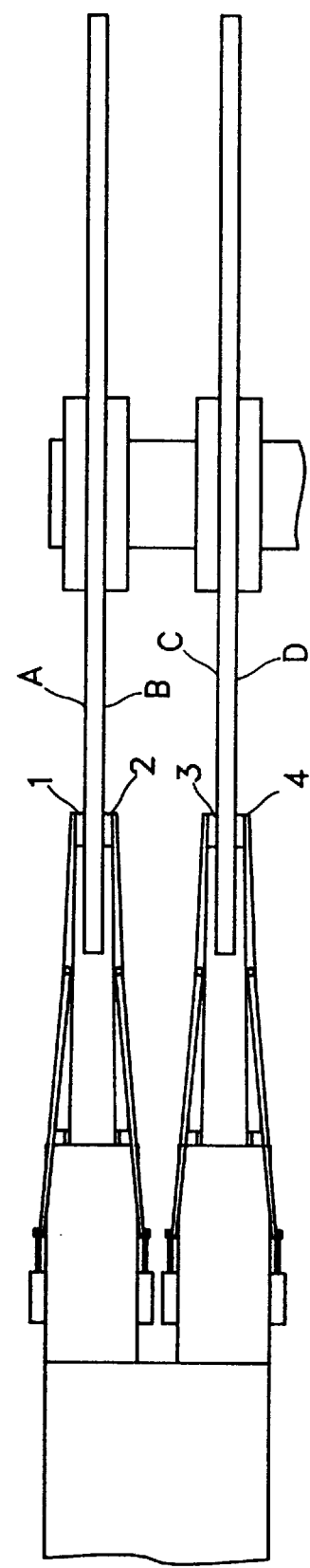
FIG. 4 is a sectional view of a hard disk drive constructed according to the principles of the present invention.

FIG. 4 is a sectional view of a hard disk drive constructed according to the principles of the present invention. The disk drive of FIG. 4 includes two disks, each of which has upper and lower recording surfaces for a total of four recording surfaces A through D, and four recording heads 1 through 4.

In the conventional art, each recording surface has the same servo pattern configuration so that the area occupied by the servo sectors on each recording surface is identical. That is, according to conventional embedded servo patterns, all of the recording surfaces have the same servo pattern on the same numbered track. The present invention, on the other hand, provides that only one recording surface among the four recording surfaces has a servo pattern with a complete set of track number information (i.e., gray code) recorded outside the burst regions, as shown in FIG. 5. The remaining three recording surfaces have no gray code recorded outside the burst regions, or contain only a portion of gray code outside the burst regions, as shown in FIG. 6, so that the data sector for recording user information can be enlarged.

Figure 11:
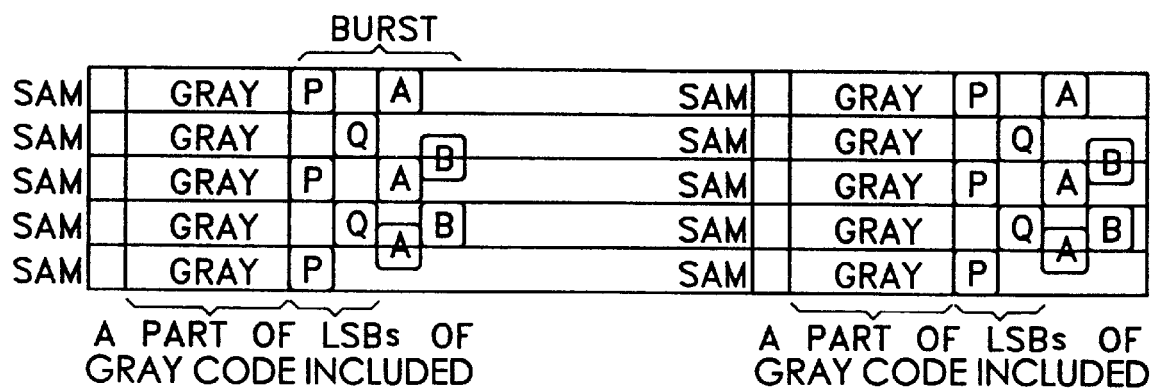
FIG. 11 shows the structure of a servo pattern recorded on the remaining recording surfaces having only a portion of the gray code recorded outside the burst regions, as shown in FIG. 6.
Figure 12:
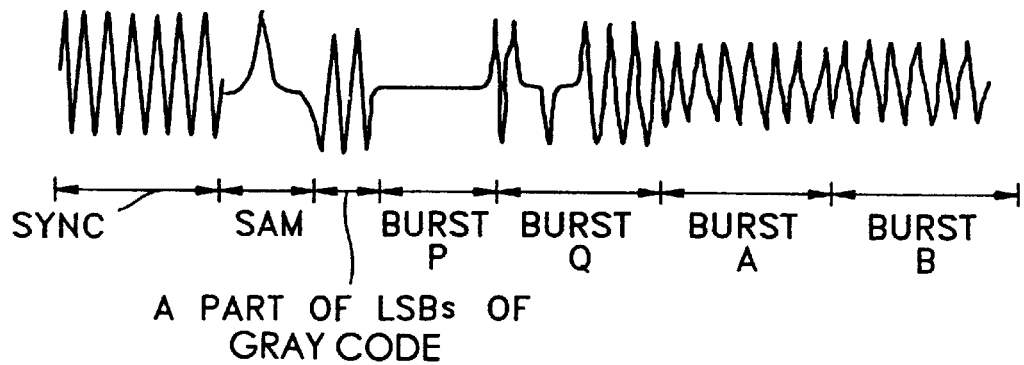
FIG. 12 shows the read back waveform of the servo pattern recorded on the remaining recording surfaces having only a portion of the gray code recorded outside the burst regions, as shown in FIG. 6.

For example, if a recording surface A of FIG. 5 has a servo pattern with a full gray code, as shown in FIG. 7, each of the remaining recording surfaces B, C and D of FIG. 6 have a reduced servo sector with no gray code outside of the burst regions, as shown in FIG. 9, or with only a portion of the gray code outside of the burst regions, as shown in FIG. 11.

As indicated in FIGS. 5 and 6, the recording surface of a hard disk is separated into sectors 10 and tracks 20, and a servo pattern is recorded on a servo sector 101. The remaining recording surface includes a data sector 102 where a data field and an identification (ID) field are recorded.

The servo patterns shown in FIGS. 7, 9 and 11 include a SYNC portion (i.e., preamble, although not shown), a servo address mark (SAM), gray code, burst, and the like. The SYNC portion is used to record a signal that enables more stable detection of the servo pattern when each read/write head 1, 2, 3 or 4 is moved from the data sector 102 to the servo sector 101. The servo address mark (SAM) is used for system synchronization. That is, during a read operation, although the timing of a servo pattern is shifted by the vibration of a spindle motor during rotation of the disk, the servo information synchronized with the shifted servo pattern can be read.

There are n number of tracks, and each track has its own number. The track number is recorded using gray code, and is used to seek the address of a desired target track. Each track has its own servo pattern on which the track number is encoded with the corresponding gray code. Also, a track can again be separated into m number of servo sectors, on which the servo pattern is recorded and each servo sector on the same track has the same servo pattern.

As shown in FIG. 7 an embodiment of the hard disk drive constructed according to the present invention has at least one specific recording surface (for example, surface A) whose servo patterns have a full gray code outside of the burst regions for seeking a specific track on the hard disk. Note that in FIG. 7, the gray code is again recorded in the servo burst regions P and Q using frequency conversion of the burst signal to obtain a signal identical to that detected during read back, as shown in FIG. 8. This is useful for determining whether or not the head on a target recording surface is precisely positioned on a target track during a track following operation. In other words, it acts as a double safety measure for ensuring proper positioning of the target recording head, thereby improving the stability of servo control.

A hard disk drive constructed according to a first embodiment of the present invention includes a specific recording surface A, and three remaining recording surfaces B, C and D. The servo pattern on each of the remaining recording surfaces B, C and D contains no gray code outside of the burst regions P and Q, as shown in FIG. 9. That is, gray code is recorded in the burst regions P and Q using a frequency conversion method upon the burst signal, as indicated by the signal detected during read back shown in FIG. 10.

In the first embodiment of the present invention, the track seeking operation for locating the target track is performed by first head 1 which becomes the seek head when the target track is on the first recording surface A, or by one of the remaining heads 2, 3 and 4 which becomes the seek head when the target track is on one of the remaining recording surfaces B, C, or D. Track following is performed by the seek head determined in the track seeking operation. The seek head is a head for seeking the target track on the recording surface containing the target track. The gray code recorded in burst regions P and Q using a frequency conversion method is used for determining whether or not the head on the target recording surface is precisely positioned on the target track in the same manner as described above.

Figure 10:
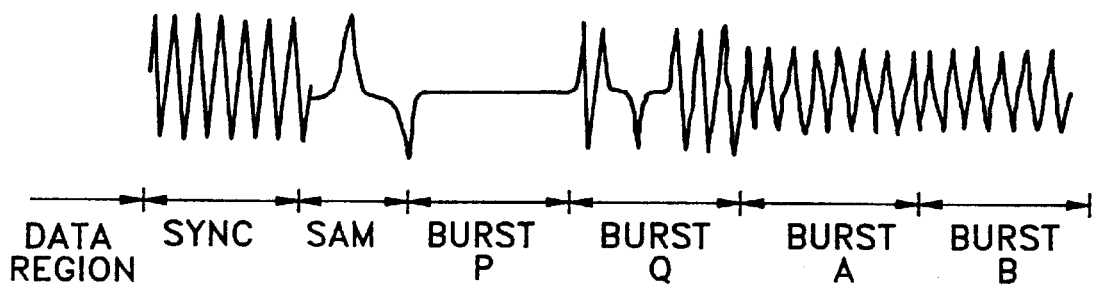
FIG. 10 shows a read back waveform of a servo pattern recorded on the remaining recording surfaces with no gray code recorded outside the burst regions, as shown in FIG. 6.

A second embodiment of the present invention also includes one specific recording surface A and three remaining recording surfaces B, C and D. According to this second embodiment, the servo pattern on each of the remaining recording surfaces B, C and D is arranged so that only the least significant bits (LSBs) of the gray code are included outside of the burst regions P and Q, as shown in FIG. 11. Moreover, the full gray code is recorded in the burst regions P and Q using frequency conversion to obtain a signal identical to that detected during read back, as shown in FIG. 10.

In the second embodiment of the present invention, the track seeking operation is separated into a long track seek mode and a short track seek mode. The first head 1 on the specific recording surface A performs the track seeking operation only in the long track seek mode when the target track is far from the current track. Also, track following during the long track seek mode is performed by the first head 1 when it is positioned on the target track of the specific recording surface A, and by one of the remaining heads 2, 3 and 4 positioned on the target track of one of the remaining surfaces B, C and D.

In the short track seek mode where the target track is located near the current track, track seeking and track following are performed at the same time by only changing the seek head. If the target track and the current seek head are positioned on the same recording surface, the current seek head retains its function as the seek head. The gray code recorded in the burst regions P and Q using frequency conversion is used for determining whether or not the target head is precisely positioned on the target track during the target track following step in the same manner as described above.

The driving methods of the first and second embodiments of the present invention will now be described.

First, a hard disk drive controller (not shown) performs the track seeking operation for detecting the current position of the seek head positioned on a track by reading the track number information from the servo pattern of the track. Once the track seeking operation is completed, an on-track step for positioning the seek head on the center of the detected track is performed so that a user can read data from or write data to the track. Such an on-track step is a track following step for keeping the seek head on the detected target track. The on-track step is controlled by detecting an off-track quantity from the burst signal recorded on half of the track.

Consequently, the track seeking operation is performed by reading gray code indicating a track number, and track following is thereafter performed by reading the burst signal recorded on each sector and detecting the quantity of off-track therefrom.

Figure 13:
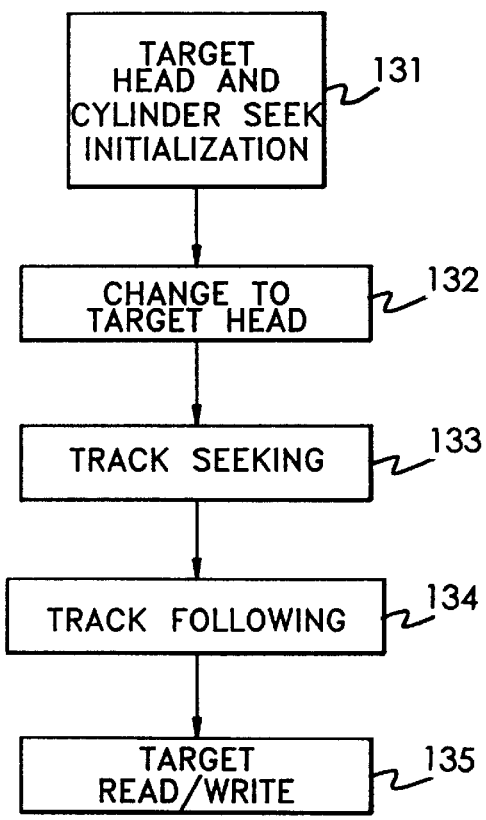
FIG. 13 is a flow chart showing the steps of a general track seeking operation.

According to a general embedded servo pattern, all recording surfaces in a disk drive and all tracks thereon have servo patterns, and the servo patterns on the same cylinder of all recording surfaces are identical. A general read and write operation is performed according to the method shown in FIG. 13. Such a reading and writing operation is performed in a manner similar to the driving method of the short track seek mode of the second embodiment of the present invention. The only difference is that the driving method of the present invention further includes a step of determining whether or not the seek head is precisely positioned on the target track during track following by using the full gray code recorded in the burst regions P and Q. In the method shown in FIG. 13, an initialization is performed in step 131 by seeking a cylinder (which is defined as a set of tracks having the same radius on all the recording surfaces) where a target track exists and determining the direction and distance of the target track from the current track (i.e., the track on which the current seek head is positioned). Then, in step 132, the current seek head is changed to a head (i.e., target head) corresponding to the recording surface where a target track is located. In step 133, a track seeking operation is performed using the target head to locate the target track. Once the target track is located, track following is performed in step 134 to keep the target head on-track. Once the seek head is precisely positioned on the target track, data is read from or written to the target track, in step 135.

Figure 14:
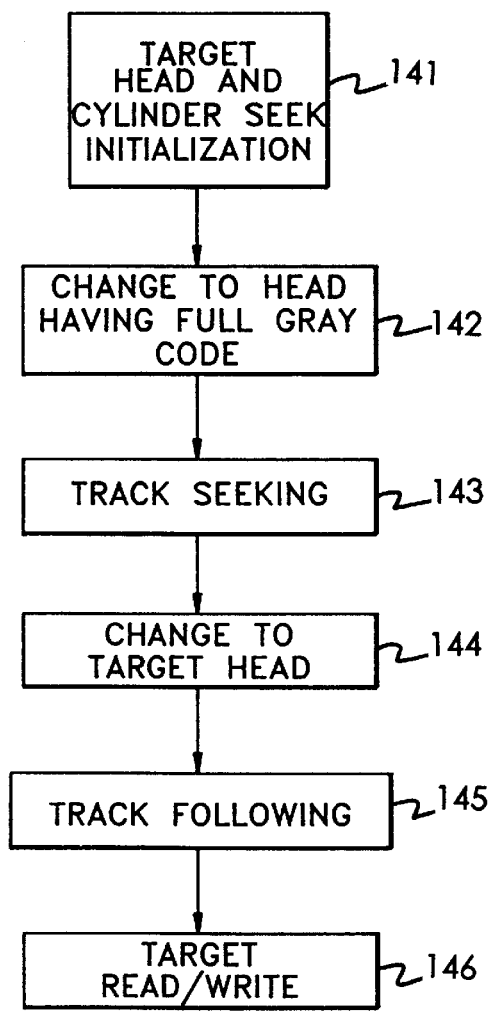
FIG. 14 is a flow chart showing the steps of a track seeking operation according to the hard disk servo pattern shown in FIG. 6, in which all the recording surfaces except for a specific recording surface have no gray code recorded outside the burst regions.

Referring to FIG. 14, the driving method of the first embodiment of the present invention is shown. In this first embodiment, all recording surfaces in the hard disk drive, except for one (for example, recording surface A in FIG. 4), have no gray code recorded outside the burst regions P and Q.

In step 141, an initialization is performed by seeking a cylinder (which is defined as a set of tracks having the same radius on all the recording surfaces) where a target track exists and determining the direction and distance of the target track cylinder from the current track (i.e., the track on which a current seek head is positioned). Then, in step 142, the current seek head is changed to first head 1 on the recording surface A having a full gray code recorded outside of the burst regions. In step 143, a track seeking operation is performed using the first head 1 on the recording surface A having a full gray code recorded outside of the burst regions. This track seeking operation is performed based on the location of the target track. In step 144, a seek head changing operation is performed by changing the current seek head (i.e., head 1) to the head (among heads 1 through 4) corresponding to the recording surface (among recording surfaces A, B, C and D) having the target track. When the target track is positioned on recording surface A having the full gray code outside of the burst regions, no changing among heads is necessary in step 144.

Next, in step 145, track following is performed to keep the seek head on-track by reading the burst signals on the target track. When performing track following in step 145, the gray code recorded in the burst regions through frequency modulation can be used for determining whether or not the seek head is precisely positioned on the target track. Once the seek head is precisely positioned on the target track, data is read from or written to the target track, in step 146.

A second embodiment of the driving method according to the present invention utilizes the second embodiment of the hard disk drive having a reduced servo field. In this second embodiment, all of the recording surfaces of the hard disk drive, except for one (for example, recording surface A of FIG. 4), have a servo pattern with only the least significant bits (LSBs) of the gray code existing outside of the burst regions.

With the second embodiment, the track seeking operation can be performed without changing the seek head in the range detected by only the least significant bits (LSBs) of the gray code in the short track seek mode, thereby reducing the time for seeking a target track. On the contrary, the first embodiment of the present invention consumes more time because the track seeking operation is performed after changing from a current seek head to the head which is positioned on the recording surface having a full gray code outside the burst regions, without exception.

The second embodiment of the driving method according to the present invention will now be described in detail with reference to FIG. 15.

Figure 15:
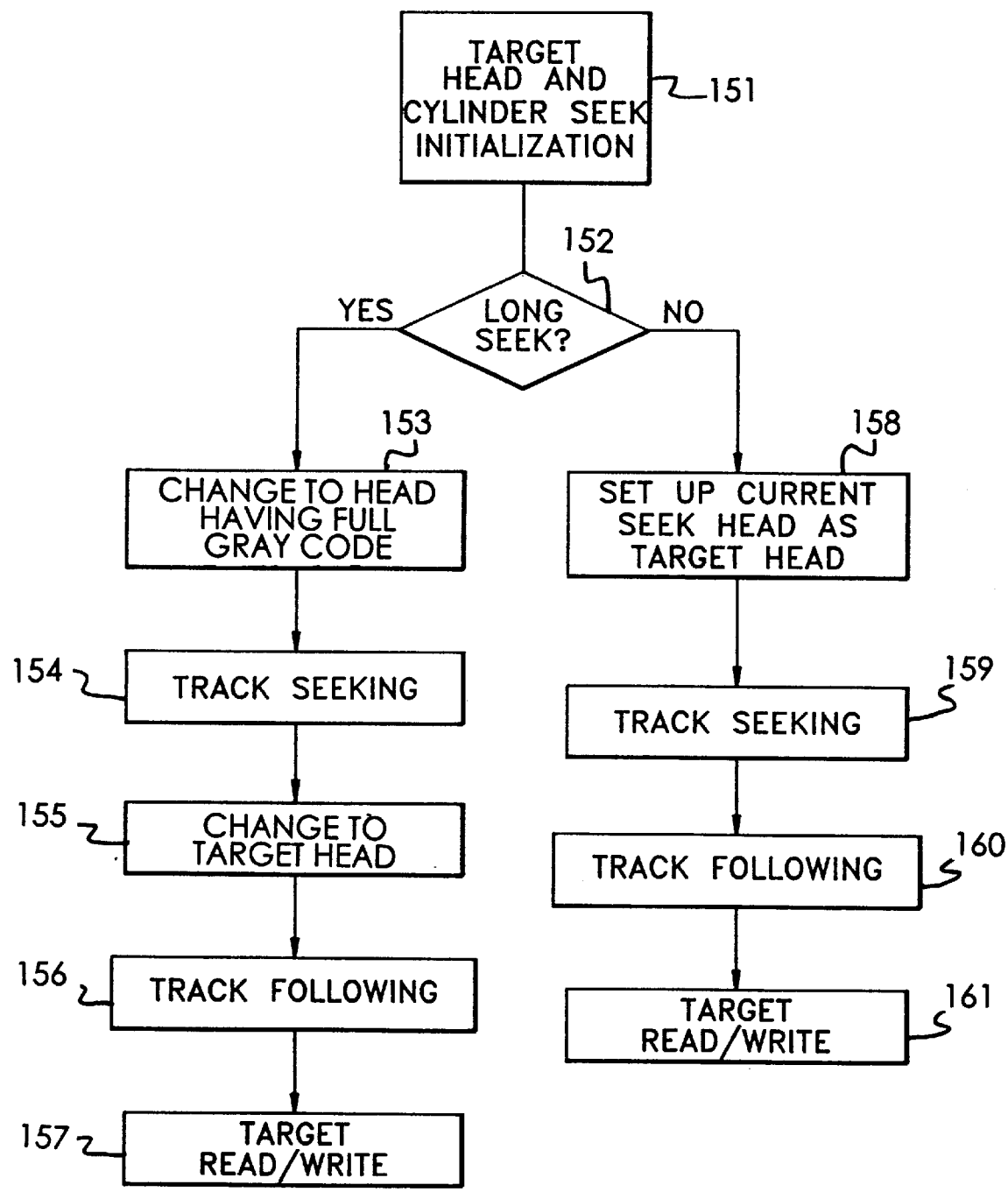
FIG. 15 is a flow chart showing the steps of a track seeking operation according to the hard disk servo pattern shown in FIG. 6, in which all the recording surfaces except for a specific recording surface have only a portion of the gray code recorded outside the burst regions.

In the method of FIG. 15, read and write operations are performed by selecting between a long track seek mode and a short track seek mode in order to reduce a track seek time. That is, the servo pattern of the recording surfaces having only the four least significant bits (LSBs) of gray code recorded outside the burst regions, can be used to detect 16 (i.e., $2^4$) tracks. Within this range, the short track seek mode is performed without changing the seek head.

In step 151, an initialization is performed by seeking a cylinder (which is defined as a set of tracks having the same radius on all the recording surfaces) where a target track exists and determining the direction and distance of the target track cylinder from the current track (i.e., the track on which the current seek head is positioned). Then, in step 152, a selection between the long and short track seek modes is made. When the long track seek mode is applicable, steps 153 through 157 are performed.

In step 153, the current seek head is changed to first head 1 on the recording surface A having a full gray code (outside of the burst regions). In step 154, a track seeking operation is performed using the first head 1 on the recording surface A having a full gray code outside of the burst regions. In step 155, a seek head changing operation is performed by changing the current seek head (i.e., head 1) to the head (among heads 1 through 4) corresponding to the recording surface (among recording surfaces A, B, C and D) having the target track. When the target track is positioned on recording surface A having the full gray code outside of the burst regions, no changing among heads is necessary in step 155.

Next, in step 156, track following is performed to keep the seek head on-track by reading the burst signals on the target track. When performing track following in step 156, the gray code recorded in the burst regions through frequency modulation can be used for determining whether or not the seek head is precisely positioned on the target track. Once the seek head is precisely positioned on the target track, data is read from or written to the target track, in step 157.

Alternatively, when the short track seek mode is selected in step 152, steps 158 through 161 are performed. In step 158, the current seek head is changed to a head (i.e., target head) corresponding to the recording surface where a target track is located. In step 159, a track seeking operation is performed using the target head to locate the target track. Once the target track is located, track following is performed in step 160 to keep the target head on-track. Once the seek head is precisely positioned on the target track, data is read from or written to the target track, in step 161.

FIG. 16 shows an example of the servo pattern on a conventional recording surface, and FIG. 17 shows an embodiment of the servo pattern according to the present invention which is recorded on the specific recording surface A having a full gray code outside of the burst regions. The main difference between the servo patterns shown in FIGS. 16 and 17 is that a full gray code is also recorded in the burst regions of the servo pattern of FIG. 17 (as indicated by the criss-crosses) using frequency conversion.

Figure 19:
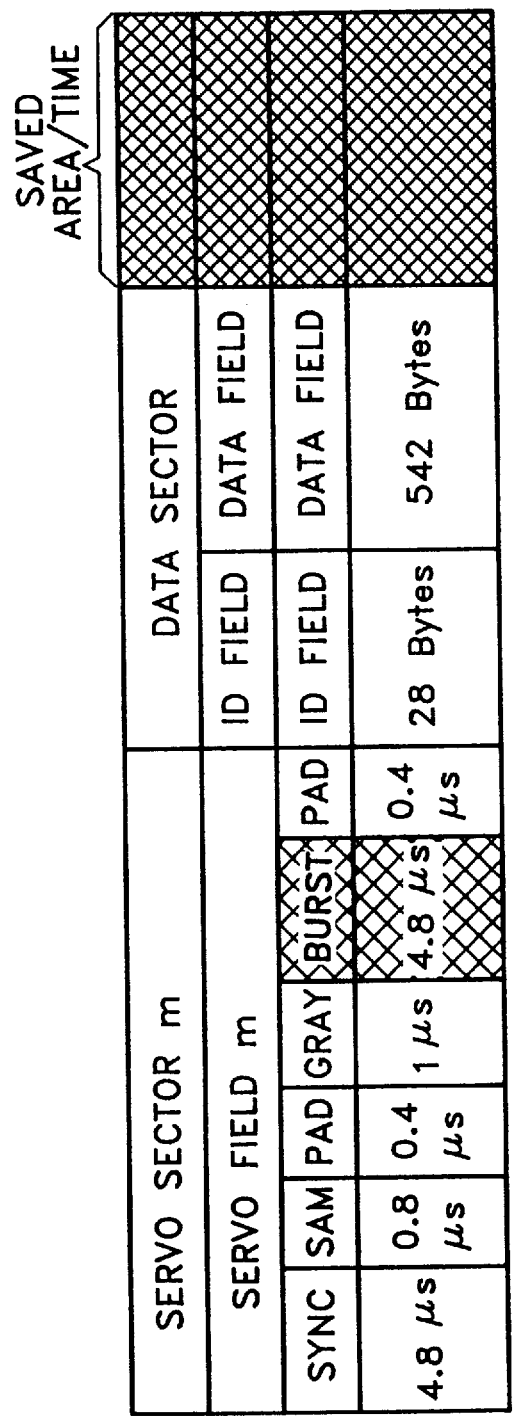
FIG. 19 shows an embodiment of the present invention in which the servo pattern on the remaining recording surfaces (except for the specific recording surface shown in FIG. 5) is provided with only a portion of the gray code recorded outside the burst regions, as shown in FIG. 6.

FIG. 18 shows an embodiment of the servo pattern of the present invention in which no gray code is recorded outside the burst regions on the remaining recording surfaces B, C, and D. That is, a full gray code is recorded in the burst regions (as indicated by the criss-crosses). FIG. 19 shows an embodiment of the servo pattern according to the present invention having only a portion of the gray code recorded outside the burst regions on the remaining recording surfaces B, C, and D. That is, a full gray code is recorded in the burst regions (as indicated by the criss-crosses), and a portion of gray code is recorded outside the burst regions. As shown in FIGS. 18 and 19, the recording surfaces, except for the specific recording surface A, according to the first and second embodiments of the present invention have reduced sized servo sectors by partially or completely omitting the gray code from outside the burst regions, thereby enlarging the area available for data sectors.

As described above, the hard disk drive of the present invention provides hard disks with reduced sized servo sectors, thereby allowing more disk space to be devoted to data sectors. According to the first and second embodiments of the present invention, one specific recording surface from among a plurality of recording surfaces includes a servo pattern with a full gray code recorded outside of the burst regions. This specific recording surface also includes a full gray code within the burst regions P and Q. The remaining recording surfaces have servo patterns with no gray code outside the burst regions (first embodiment), or only a portion of gray code outside the burst regions (second embodiment). In both the first and second embodiments, these remaining recording surfaces also include a full gray code recorded within the burst regions P and Q.

Moreover, the driving method for the hard disk drive according to the present invention provides that track following can be performed more precisely. That is, recording the full gray code in the burst regions of the servo pattern acts as a double safety device for positioning the target recording head on the desired target track more precisely, thereby improving the stability of the servo control of the hard disk drive.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A hard disk, comprising:
    a first recording surface having first servo sectors with first burst regions positioned within each one of said first servo sectors, each one of said first servo sectors having a first full gray code recorded outside said corresponding first burst regions; and
    a second recording surface having second servo sectors with second burst regions positioned within each one of said second servo sectors, each one of said second servo sectors having a second full gray code recorded within said corresponding second burst regions and no gray code recorded outside said corresponding second burst regions.

2. The hard disk as claimed in claim 1, further comprised of each one of said first servo sectors having a third full gray code recorded within said corresponding first burst regions.

3. The hard disk as claimed in claim 1, wherein said second full gray code is recorded within said corresponding second burst regions by performing a frequency conversion upon a burst signal of said second burst regions.

4. The hard disk as claimed in claim 2, wherein said third full gray code is recorded within said corresponding first burst regions by performing a frequency conversion upon a burst signal of said first burst regions.

5. A hard disk, comprising:
    a first recording surface having first servo sectors with first burst regions positioned within each one of said first servo sectors, each one of said first servo sectors having a first full gray code recorded outside said corresponding first burst regions; and
    a second recording surface having second servo sectors with second burst regions positioned within each one of said second servo sectors, each one of said second servo sectors having a second full gray code recorded within said corresponding second burst regions and a partial gray code recorded outside said corresponding second burst regions.

6. The hard disk as claimed in claim 5, further comprised of each one of said first servo sectors having a third full gray code recorded within said corresponding first burst regions.

7. The hard disk as claimed in claim 5, wherein said second full gray code is recorded within said corresponding second burst regions by performing a frequency conversion upon a burst signal of said second burst regions.

8. The hard disk as claimed in claim 6, wherein said third full gray code is recorded within said corresponding first burst regions by performing a frequency conversion upon a burst signal of said first burst regions.

9. The hard disk as claimed in claim 5, wherein said partial gray code comprises a predetermined number of least significant bits of gray code.

10. The hard disk as claimed in claim 6, wherein said partial gray code comprises a predetermined number of least significant bits of gray code.

11. The hard disk as claimed in claim 7, wherein said partial gray code comprises a predetermined number of least significant bits of gray code.

12. The hard disk as claimed in claim 8, wherein said partial gray code comprises a predetermined number of least significant bits of gray code.

13. A method for driving a hard disk drive employing first and second recording surfaces, said method comprising the steps of:
    activating a first head corresponding to said first recording surface, said first recording surface having first servo sectors with first burst regions positioned within each one of said first servo sectors, each one of said first servo sectors having a first full gray code recorded outside said corresponding first burst regions;
    performing a track seeking operation on said first recording surface with said first head based on a location of a target track positioned on said second recording surface;
    switching to a second head corresponding to said second recording surface, said second recording surface having second servo sectors with second burst regions positioned within each one of said second servo sectors, each one of said second servo sectors having a second full gray code recorded within said corresponding second burst regions and no gray code recorded outside said corresponding second burst regions; and then
    following said target track on said second recording surface with said second head.

14. The method as claimed in claim 13, wherein said following step is further comprised of determining whether or not said second head is positioned on said target track by using said second full gray code recorded within one of said second servo sectors corresponding to said target track.

15. A method for driving a hard disk drive employing first and second recording surfaces, said method comprising the steps of
    determining whether to perform a long track seek mode or a short track seek mode based on a location of a target track; and
    when said determining step indicates that said long track seek mode is to be performed, performing said long track seek mode by:
        activating a first head corresponding to said first recording surface, said first recording surface having first servo sectors with first burst regions positioned within each one of said first servo sectors, each one of said first servo sectors having a first full gray code recorded outside said corresponding first burst regions;
        performing a first track seeking operation on said first recording surface with said first head based on the location of said target track positioned on said second recording surface;

switching to a second head corresponding to said second recording surface, said second recording surface having second servo sectors with second burst regions positioned within each one of said second servo sectors, each one of said second servo sectors having a second full gray code recorded within said corresponding second burst regions and a partial gray code recorded outside said corresponding second burst regions; and then following said target track on said second recording surface with said second head.

16. The method as claimed in claim 15, wherein said following step is further comprised of determining whether or not said second head is positioned on said target track by using said partial gray code recorded within one of said second servo sectors corresponding to said target track.

17. The method as claimed in claim 15, further comprised of performing said short track seek mode when indicated by said determining step by performing a second track seeking operation on said second recording surface with said second head to seek said target track.

18. The method as claimed in claim 17, wherein said following step is further comprised of determining whether or not said second head is positioned on said target track by using said partial gray code recorded within one of said second servo sectors corresponding to said target track.

19. A hard disk drive, comprising: a plurality of data recording disks, a first one of said data recording disks comprising:

a first recording surface having first servo sectors with first burst regions positioned within each one of said first servo sectors, each one of said first servo sectors having a first full gray code recorded outside said corresponding first burst regions; and a second recording surface having second servo sectors with second burst regions positioned within each one of said second servo sectors, each one of said second servo sectors having a second full gray code recorded within said corresponding second burst regions and no gray code recorded outside said corresponding second burst regions.

20. The hard disk drive as claimed in claim 19, further comprised of each one of said first servo sectors having a third full gray code recorded within said corresponding first burst regions.

21. The hard disk drive as claimed in claim 19, wherein said second full gray code is recorded within said corresponding second burst regions by performing a frequency conversion upon a burst signal of said second burst regions.

22. The hard disk drive as claimed in claim 20, wherein said third full gray code is recorded within said corresponding first burst regions by performing a frequency conversion upon a burst signal of said first burst regions.

23. The hard disk drive as claimed in claim 19, wherein a second one of said data recording disks comprises:

a third recording surface having third servo sectors with third burst regions positioned within each one of said third servo sectors, each one of said third servo sectors having a third full gray code recorded within said corresponding third burst regions and no gray code recorded outside said corresponding third burst regions; and a fourth recording surface having fourth servo sectors with fourth burst regions positioned within each one of said fourth servo sectors, each one of said fourth servo sectors having a fourth full gray code recorded within said corresponding fourth burst regions and no gray code recorded outside said corresponding fourth burst regions.

24. A hard disk drive, comprising:

a plurality of data recording disks, a first one of said data recording disks comprising:

a first recording surface having first servo sectors with first burst regions positioned within each one of said first servo sectors, each one of said first servo sectors having a first full gray code recorded outside said corresponding first burst regions; and a second recording surface having second servo sectors with second burst regions positioned within each one of said second servo sectors, each one of said second servo sectors having a second full gray code recorded within said corresponding second burst regions and a first partial gray code recorded outside said corresponding second burst regions.

25. The hard disk drive as claimed in claim 24, further comprised of each one of said first servo sectors having a third full gray code recorded within said corresponding first burst regions.

26. The hard disk drive as claimed in claim 24, wherein said second full gray code is recorded within said corresponding second burst regions by performing a frequency conversion upon a burst signal of said second burst regions.

27. The hard disk drive as claimed in claim 25, wherein said third full gray code is recorded within said corresponding first burst regions by performing a frequency conversion upon a burst signal of said first burst regions.

28. The hard disk as claimed in claim 24, wherein said first partial gray code comprises a predetermined number of least significant bits of gray code.

29. The hard disk as claimed in claim 25, wherein said first partial gray code comprises a predetermined number of least significant bits of gray code.

30. The hard disk as claimed in claim 26, wherein said first partial gray code comprises a predetermined number of least significant bits of gray code.

31. The hard disk as claimed in claim 27, wherein said first partial gray code comprises a predetermined number of least significant bits of gray code.

32. The hard disk drive as claimed in claim 24, wherein a second one of said data recording disks comprises:

a third recording surface having third servo sectors with third burst regions positioned within each one of said third servo sectors, each one of said third servo sectors having a third full gray code recorded within said corresponding third burst regions and a second partial gray code recorded outside said corresponding third burst regions; and a fourth recording surface having fourth servo sectors with fourth burst regions positioned within each one of said fourth servo sectors, each one of said fourth servo sectors having a fourth full gray code recorded within said corresponding fourth burst regions and a third partial gray code recorded outside said corresponding fourth burst regions.

33. The hard disk as claimed in claim 32, wherein said second partial gray code comprises a predetermined number of least significant bits of gray code.

34. The hard disk as claimed in claim 32, wherein said third partial gray code comprises a predetermined number of least significant bits of gray code.

* * * * *